United States Patent
Fitzhugh

(10) Patent No.: US 10,579,080 B2
(45) Date of Patent: Mar. 3, 2020

(54) INTELLIGENT ICE PROTECTION NETWORK

(71) Applicant: Simmonds Precision Products, Inc., Vergennes, VT (US)

(72) Inventor: Christopher Fitzhugh, Essex Junction, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 54 days.

(21) Appl. No.: 15/947,413

(22) Filed: Apr. 6, 2018

(65) Prior Publication Data
US 2019/0310669 A1 Oct. 10, 2019

(51) Int. Cl.
| | | |
|---|---|---|
| *G05D 23/32* | (2006.01) | |
| *B64D 15/12* | (2006.01) | |
| *G05D 23/19* | (2006.01) | |
| *H04W 84/18* | (2009.01) | |
| *B64D 15/06* | (2006.01) | |

(52) U.S. Cl.
CPC .............. *G05D 23/32* (2013.01); *B64D 15/06* (2013.01); *B64D 15/12* (2013.01); *G05D 23/19* (2013.01); *G05D 23/1934* (2013.01); *G05D 23/1951* (2013.01); *H04W 84/18* (2013.01)

(58) Field of Classification Search
CPC ............... G05D 23/32; G05D 23/1951; G05D 23/1934; H04W 84/18; B64D 15/12
See application file for complete search history.

(56) References Cited

U.S. PATENT DOCUMENTS

| | | | | |
|---|---|---|---|---|
| 5,663,899 A | * | 9/1997 | Zvonar | G01K 15/00 236/15 BB |
| 5,822,373 A | | 10/1998 | Addy | |
| 6,227,492 B1 | * | 5/2001 | Schellhase | B64D 15/12 244/134 D |
| 6,787,744 B1 | | 9/2004 | Feher et al. | |

(Continued)

FOREIGN PATENT DOCUMENTS

| | | |
|---|---|---|
| EP | 2719623 A1 | 4/2014 |
| WO | WO2013/087534 A1 | 6/2013 |

OTHER PUBLICATIONS

Extended European Search Report for EP Application No. 19167773.1, dated Aug. 7, 2019, 7 pages.

*Primary Examiner* — Christopher E. Everett
(74) *Attorney, Agent, or Firm* — Kinney & Lange, P.A.

(57) ABSTRACT

A system for an aircraft includes a first fluid circuit extending from a first end to a second end, and a network comprising a plurality of networked heater assemblies disposed along the first fluid circuit between the first end and the second end. Each of the networked heater assemblies includes at least one temperature sensor, a heater element, and a local controller. The at least one temperature sensor is in communication with the first fluid circuit for periodically measuring a temperature in the first fluid circuit and generating a corresponding local temperature signal. The heater assembly selectively applies heat to the first fluid circuit based on the local temperature signal or another temperature signal on the network. The local controller receives the local temperature signal or another networked temperature signal and operates the heater assembly in response thereto to maintain the local temperature signal above a predetermined threshold.

17 Claims, 10 Drawing Sheets

(56) References Cited

U.S. PATENT DOCUMENTS

| | | |
|---|---|---|
| 7,337,623 B2 | 3/2008 | Fauret |
| 8,371,526 B2 | 2/2013 | Shearer et al. |
| 8,537,727 B2 | 9/2013 | Guillot et al. |
| 8,602,359 B2 | 12/2013 | Stothers |
| 8,612,067 B2 | 12/2013 | Leon et al. |
| 8,820,362 B2 | 9/2014 | Roederer et al. |
| 9,016,630 B2 | 4/2015 | Mitchell et al. |
| 9,380,647 B2 | 6/2016 | Rochell |
| 2002/0008101 A1* | 1/2002 | Hauschulz ......... G05D 23/1934 219/494 |
| 2004/0258141 A1 | 12/2004 | Tustison et al. |
| 2005/0109763 A1 | 5/2005 | Lee et al. |
| 2005/0184193 A1* | 8/2005 | Bourjac ................ B64D 15/12 244/10 |
| 2007/0112480 A1* | 5/2007 | Smith ................... B64D 15/14 701/10 |
| 2007/0158501 A1 | 7/2007 | Shearer et al. |
| 2008/0300750 A1 | 12/2008 | Davis et al. |
| 2009/0095842 A1* | 4/2009 | Gaertner, II ........... B64D 15/12 244/134 D |
| 2012/0318923 A1* | 12/2012 | Stonestreet, II ....... B64D 15/12 244/134 D |
| 2013/0013116 A1* | 1/2013 | Mancuso ............. B64D 15/166 700/275 |
| 2013/0075484 A1* | 3/2013 | Rhee ...................... G01D 4/004 236/1 F |
| 2014/0097177 A1* | 4/2014 | Rochell .................. G05D 23/19 219/486 |
| 2014/0326796 A1* | 11/2014 | Kymissis ............ F24D 19/0087 237/12 |
| 2017/0009926 A1 | 1/2017 | Marucci et al. |
| 2017/0081032 A1 | 3/2017 | Botura et al. |
| 2017/0293311 A1 | 10/2017 | Rapppoport |

\* cited by examiner

INTELLIGENT ICE PROTECTION NETWORK

BACKGROUND

The disclosure relates generally to fluid lines and circuits for aircraft, and more specifically, to maintaining fluid lines and circuits under a variety of operating conditions.

Current implementations of deicing heaters in aircraft are connected by wired networks but provide limited communication, feedback, and operating flexibility. When such a conventional heating element or temperature sensor fails, the heater reverts to a fail-safe mode. For example, upon failure or loss of communication with a temperature sensor, the corresponding heater defaults to pulsing the heating element(s) to prevent the lines from freezing under any condition, even if heat is not actually needed at a given time.

SUMMARY

An embodiment of a system for an aircraft includes a first fluid circuit extending from a first end to a second end and a network comprising a plurality of networked heater assemblies disposed along the first fluid circuit between the first end and the second end. Each of the networked heater assemblies includes at least one temperature sensor, a heater element, and a local controller. The at least one temperature sensor is in communication with the first fluid line for periodically measuring a temperature in the first fluid line and generating a corresponding local temperature signal. The heater assembly selectively applies heat to the first fluid line based on the local temperature signal or another temperature signal on the network. The local controller receives the local temperature signal or another networked temperature signal and operates the heater assembly in response thereto in order to maintain the local temperature signal above a predetermined threshold.

An embodiment of a network for an aircraft includes a plurality of modules in network communication with one another. Each of the plurality of modules includes a first node for communicating a local temperature signal corresponding to a local temperature of a first fluid, a second node for communicating a signal corresponding to operation of a heating element, and a local controller in network communication with the first and second nodes and at least one of the plurality of modules. The local controller is programmed to receive the local temperature signal, or another networked temperature signal, and operate the heating element in response thereto.

An example embodiment of a method is described for operating an aircraft fluid system comprising a plurality of networked heater modules. The method includes polling at least one first temperature sensor to periodically measure a temperature at a first location in a first fluid line and generate a first local temperature signal corresponding to the first location. The first local temperature signal or another networked temperature signal is communicated to a first local controller. At least one first heating element is operated in response to the first local temperature signal or, in the absence of the first local temperature signal, another networked temperature signal. The heating element is operated so as to selectively apply heat to the first fluid line based on the first local temperature signal, or the another networked temperature signal in order to maintain the temperature of the first fluid above a predetermined threshold.

DETAILED DESCRIPTION

Generally, networked (wired or wireless), digitally controlled heater modules can overcome and intelligently compensate for failure of one or more sensors, communications, and/or heating elements. When a "smart" heater module loses operation of its temperature sensor(s), the controller can communicate and request temperature measurements from other nearby sensors, either directly or via a central system controller. If the temperature sensor is still functional but the heater element has failed, then the local controller can broadcast its failure status and periodic temperature readings to allow other heater modules to intelligently compensate for the heating element failure. If the local controller has failed, other units and/or the central controller will recognize absence of communication, and either operate the orphaned module remotely and/or operate adjacent heating units at a higher duty cycle to compensate for an inability to operate the orphaned temperature sensor and heating element.

Figure 1:
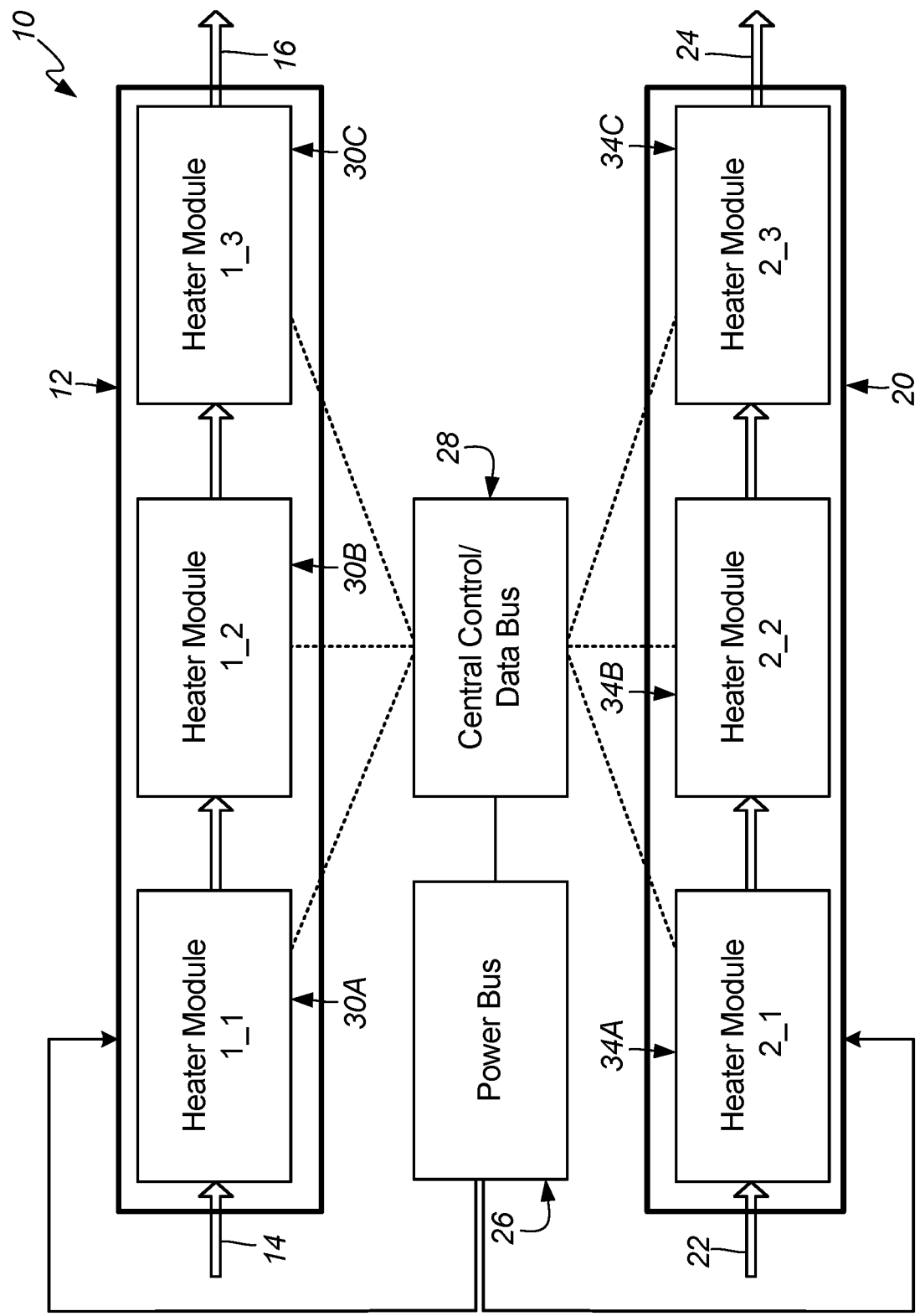
FIG. 1 is a general schematic of a first networked fluid system for an aircraft according to the disclosure.

FIG. 1 broadly shows a first example implementation of a fluid system 10 for an aircraft. Fluid system 10 will include a plurality of fluid lines or circuits (below 12 and 20) carrying water, antifreeze, oil, fuel, or the like. To conserve energy, many of these fluid lines or circuits are placed in heat exchange relationship with one another (not shown) at various locations throughout an aircraft (not shown for clarity). However, some of these fluid lines require additional heating particularly those at locations having a high risk of freezing.

Thus FIG. 1 generally shows first fluid circuit 12 extending from first end 14 to second end 16, while second fluid circuit 20 extends from first end 22 to second end 24. As noted, most implementations will have more than two fluid lines or circuits, but the two example fluid circuits 12, 20 should be sufficient to illustrate and explain the concepts herein to a skilled artisan without unnecessary duplication or confusion.

FIG. 1 also generally shows one or more heater assemblies or modules (here, 30A, 30B, 30C) disposed along each of first fluid circuit 12 and second fluid circuit 20. As a first fluid (typically but not exclusively water) flows from first end 14 to second end 16 (or vice versa) of first circuit 12, it passes through (or around via bypass, not shown) each of heater modules 30A, 30B, 30C. Similarly, a second fluid (same or different from the first fluid) flows from first end 22 to second end 24 (or vice versa) of second circuit 20, passing through (or around via bypass, not shown) each of heater modules 34A, 34B, 34C. Heater modules are powered by one or more buses 26, and communication is facilitated by central controller/data bus 28.

Each of the plurality of heater modules are networked according to various protocols and configurations, two non-limiting examples of which are shown here. FIG. 1 shows the network as a hierarchical network, while FIG. 4 will show a similar architecture with a decentralized mesh network. A local controller in each module (best seen in other figures) can include a wireless radio or a power-line communication adapter. Each element in each module can serve as a node in the network and communicate in various ways, both according to and in addition to the disclosure. Example implementations of such modules are described in detail in U.S. Provisional Patent Application No. 62/628,523 filed on Feb. 9, 2018, which is subject to an obligation of assignment to the Applicant named in the instant case. The '523 application is incorporated by reference herein in its entirety.

Figure 2:
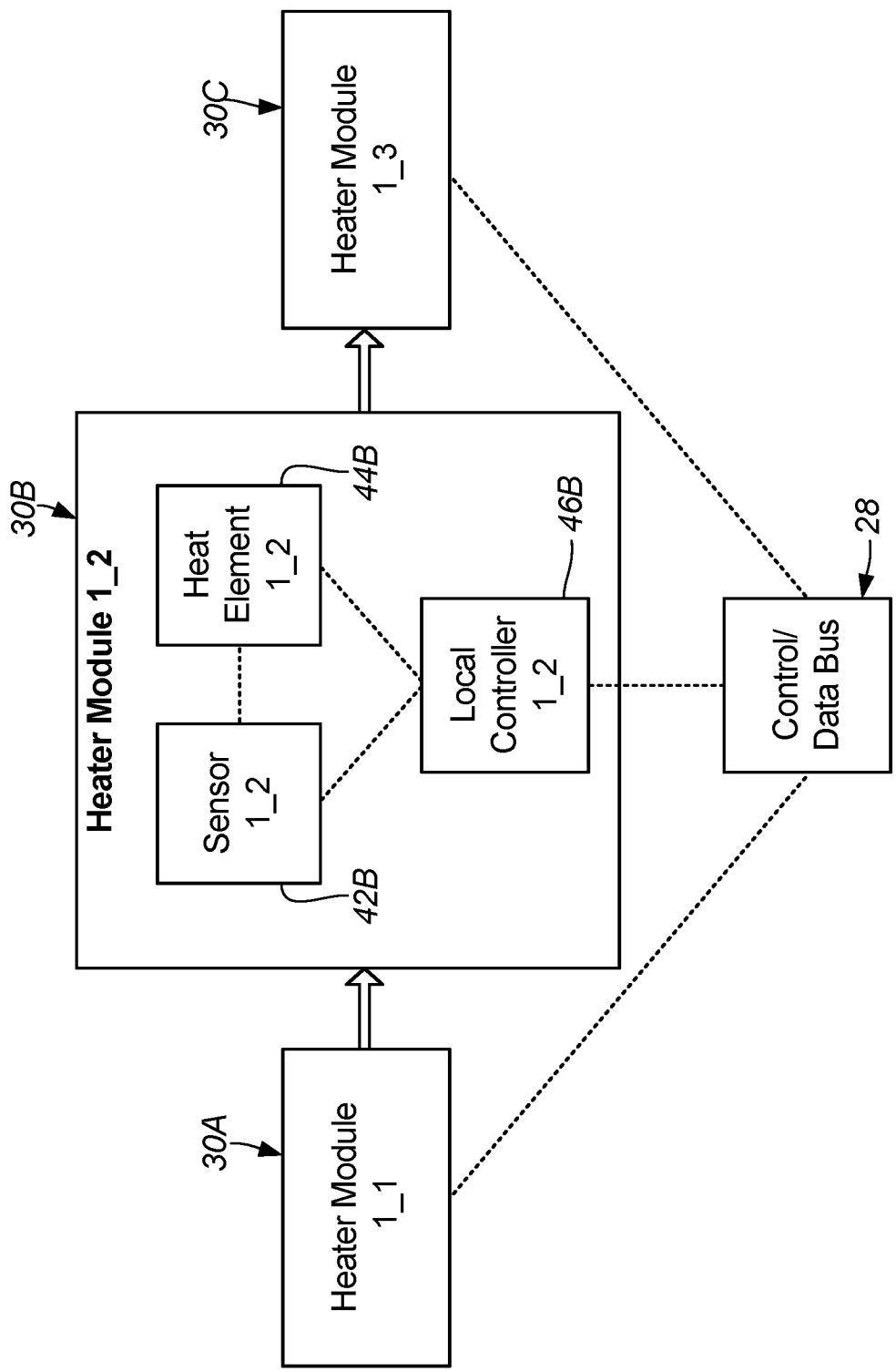
FIG. 2 is a detailed schematic including elements of an individual heater module in the system of FIG. 1.

FIG. 2 shows an example arrangement of a single heater assembly/module under normal operation. For purposes of illustration and not limitation, FIG. 2 shows details of heater module 30B (also identified as module 1_2 in order to maintain consistent numbering of the components making up each module).

Module 30B (as well as other heater modules) includes at least one temperature sensorhere, sensor 42B (also identified as sensor 1_2). Sensor 42B is in communication with first fluid line circuit 12 for periodically measuring a temperature in first fluid circuit 12 and generating a corresponding local temperature signal of the first fluid. While temperature sensors described herein typically measure the fluid temperature via contact with the fluid, this disclosure or claims should not be read to exclude other (i.e., noncontact) modes of communicating with the fluid unless explicitly stated.

It also includes at least one heater element 44B (also identified as heater element 1_2) configured to selectively apply heat to first fluid circuit 12 based on the local temperature signal or another temperature signal on the network, as discussed below. Local controller 46B (controller 1_2) is programmed to receive the local temperature signal or another networked temperature signal and operate heater element 44B in response thereto, in order to maintain the local temperature signal above a predetermined threshold.

During normal operation, heater element 44B is locally controlled by local controller 46B based on local temperature signals from temperature sensor 42B. Temperature sensor 42B is polled at a first polling frequency corresponding to normal operation of the overall system. Heater element 44B is operated at a first duty cycle corresponding to normal operation of the overall system.

Figure 3A:
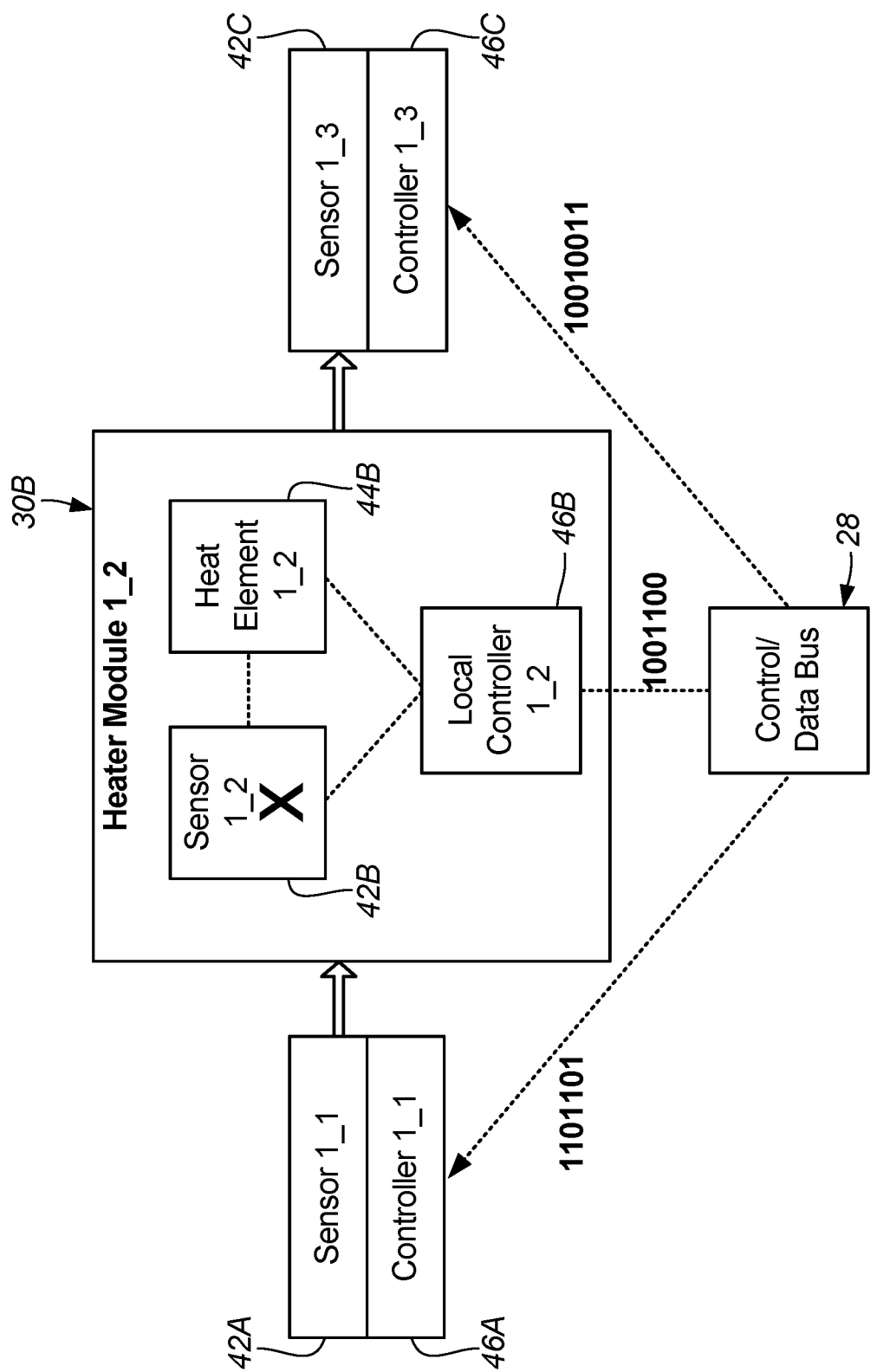
FIGS. 3A-3C show scenarios involving failure of different elements in an example heater module in the system of FIG. 1.
Figure 3B:
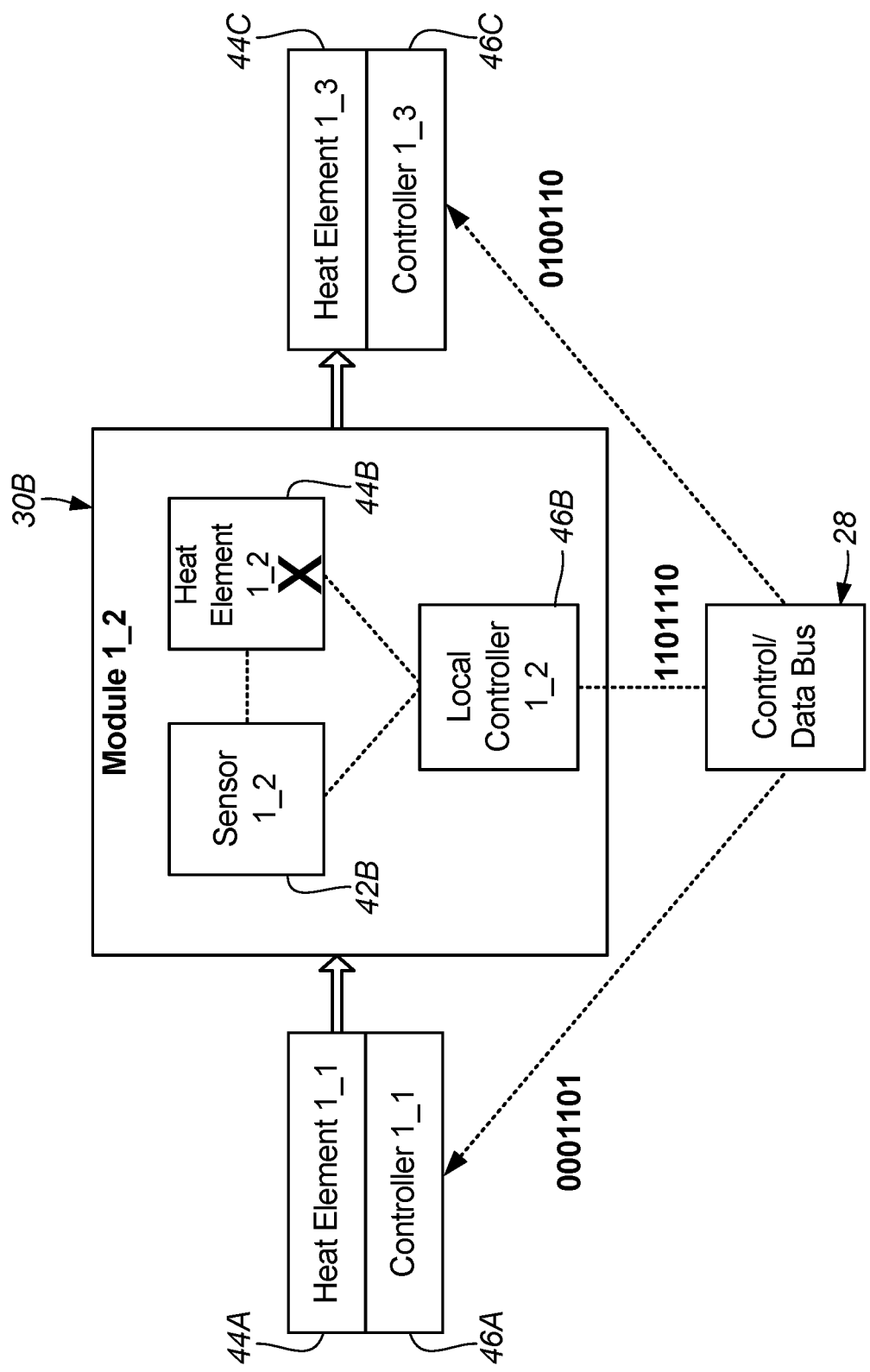
Figure 3C:
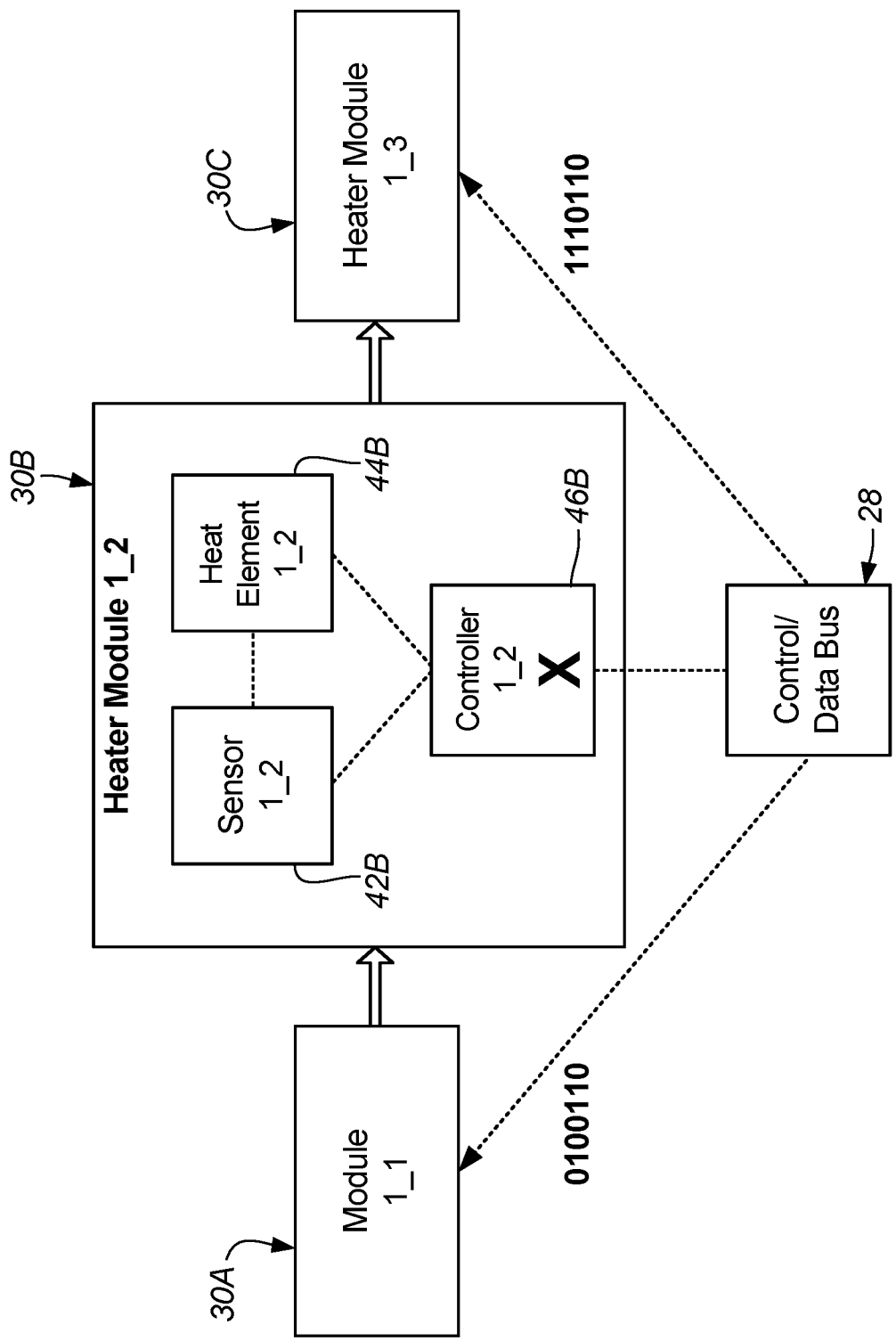

FIGS. 3A-3C show failure scenarios for different elements of a heater module, and the system response thereto. FIGS. 3A-3C are similar to FIG. 2, but differ by showing relevant details of neighboring modules 30A, 30C rather than the modules themselves. This will be made clearer in the explanation of each figure.

Beginning with FIG. 3A, module 30B includes temperature sensor 42B, heating element 44B, and local controller 46B, similar to FIG. 2. However, in FIG. 3A, temperature sensor 42A and local controller 46A take the place of module 30A, while temperature sensor 42C and local controller 46C take the place of module 30C relative to FIG. 2.

Upon determination that at least one temperature sensor (e.g., temperature sensor 42B, has failed (represented by the 'X'), local controller 46B is configured to communicate such determination to a local controller in at least another one of the networked heater assemblies. Here, that is one or both of local controllers 46A, 46C. As a result, at least one of the remaining operative temperature sensors (such as 42A and/or 42C) are polled at a second polling frequency greater than a first polling frequency corresponding to normal operation of the overall system (referenced in FIG. 2). In most cases, as shown here at least one of the remaining operative temperature sensors is immediately upstream or downstream of the failed temperature sensor(s). In any case, the remote temperature signal(s) can be transmitted to the local controller corresponding to the failed sensor in order to operate the local heater element (here, 44B). In a conventional operation, the local heater element would not receive any input at all, and would instead operate cyclically in a fail-safe mode to ensure icing doesn't occur.

Moving to FIG. 3B, module 30B still includes temperature sensor 42B, heating element 44B, and local controller 46B. However, in FIG. 3B, heating element 44A and local controller 46A take the place of module 30A, while temperature sensor 42C and local controller 46C take the place of module 30C relative to FIG. 2.

Upon determination of a failure of the heater assembly (represented by the 'X'), local controller 46B is configured to communicate such determination to a local controller in at least another one of the networked heater assemblies. Here, that is one or both of local controllers 46A, 46C. As a result, at least one of the remaining operative heater elements (such as 44A and/or 44C) are then activated by their respective local controller at a second duty cycle greater than a first duty cycle corresponding to normal operation of the overall system. At least one of the remaining operative heater assemblies is immediately upstream or downstream of the failed at least one heater assembly.

With respect to FIG. 3C, upon determination of a failure of the local controller (represented by the 'X'), such determination is communicated to at least one other local controller in another of the networked heater modules (e.g., 46A and/or 46C in FIGS. 3A and 3B). These remote controller(s) can take temporary control of the local sensor (42B) and/or heater element (44B) until the failed controller can be rebooted or repaired. Additionally or alternatively, one or both controllers 46A, 46C (in FIGS. 3A and 3B) can operate their local sensor and/or heating element to compensate during a time when local sensor (42B) and/or heater element (44B) cannot be controlled by local controller 46B.

In all three failure scenarios described above, the communication is done by way of central controller/data bus 28. However, FIGS. 4-6C show an alternate configuration of a fluid system with a mesh-type network where the communication between controllers happens directly, bypassing a central controller. In certain of these following embodiments, the network has no central controller, at least for purposes of managing the fluid system.

Figure 4:
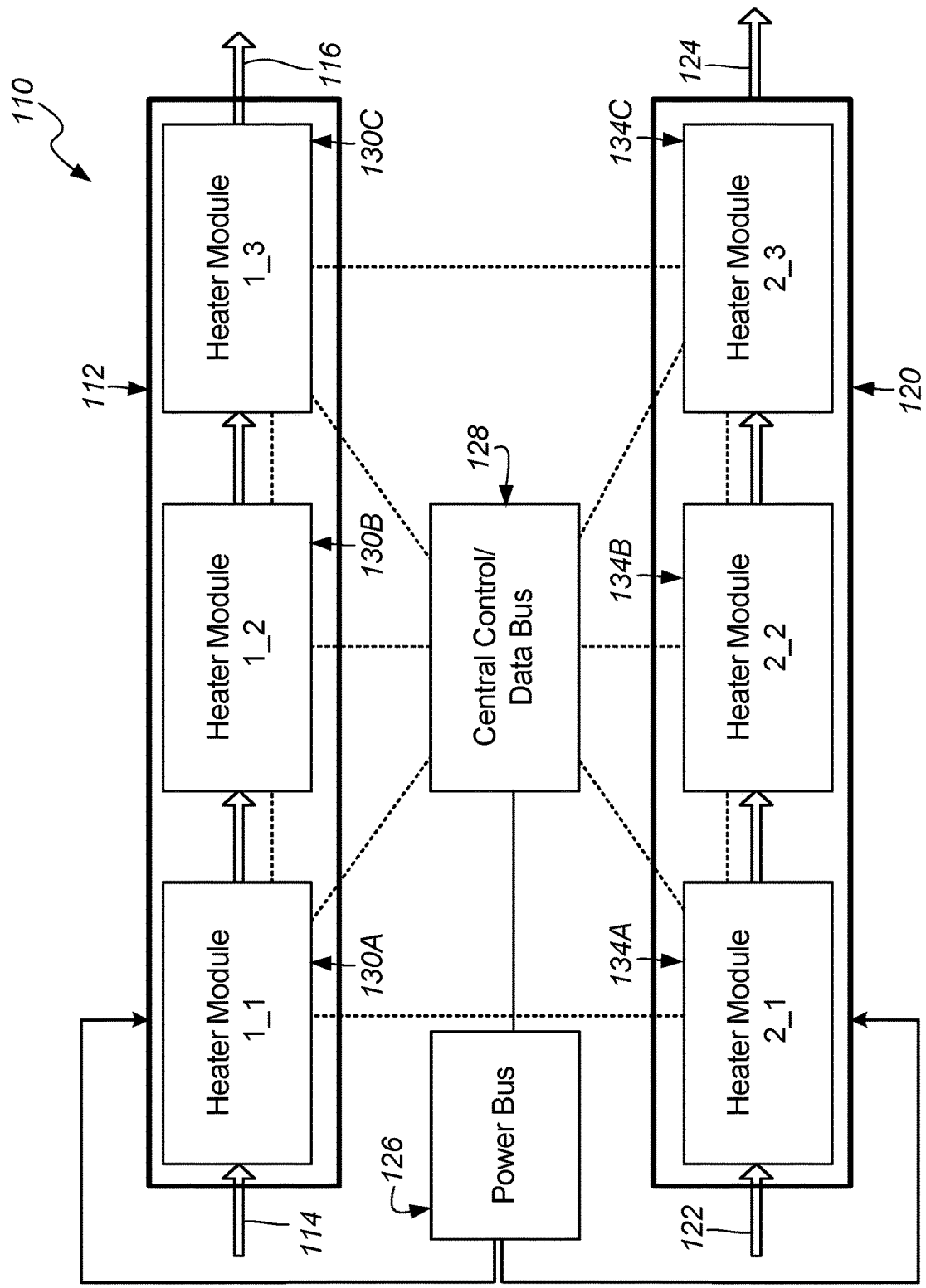
FIG. 4 is a general schematic of a second networked fluid system for an aircraft according to the disclosure.

FIG. 4 generally shows first fluid circuit 112 extending from first end 114 to second end 116, while second fluid circuit 120 extends from first end 122 to second end 124. FIG. 1 also generally shows heater assemblies or modules disposed along each of first fluid circuit 112 and second fluid circuit 120. As a first fluid (typically but not exclusively water) flows from first end 114 to second end 116 (or vice versa) of first circuit 112, it passes through (or around via bypass, not shown) each of heater modules 130A, 130B, 130C. Similarly, a second fluid (same or different from the first fluid) flows from first end 122 to second end 124 (or vice versa) of first circuit 120, passing through (or around via bypass, not shown) each of heater elements 134A, 134B, 134C. Heater modules are powered by one or more buses 126, and communication is facilitated by central controller/data bus 128.

Figure 5:
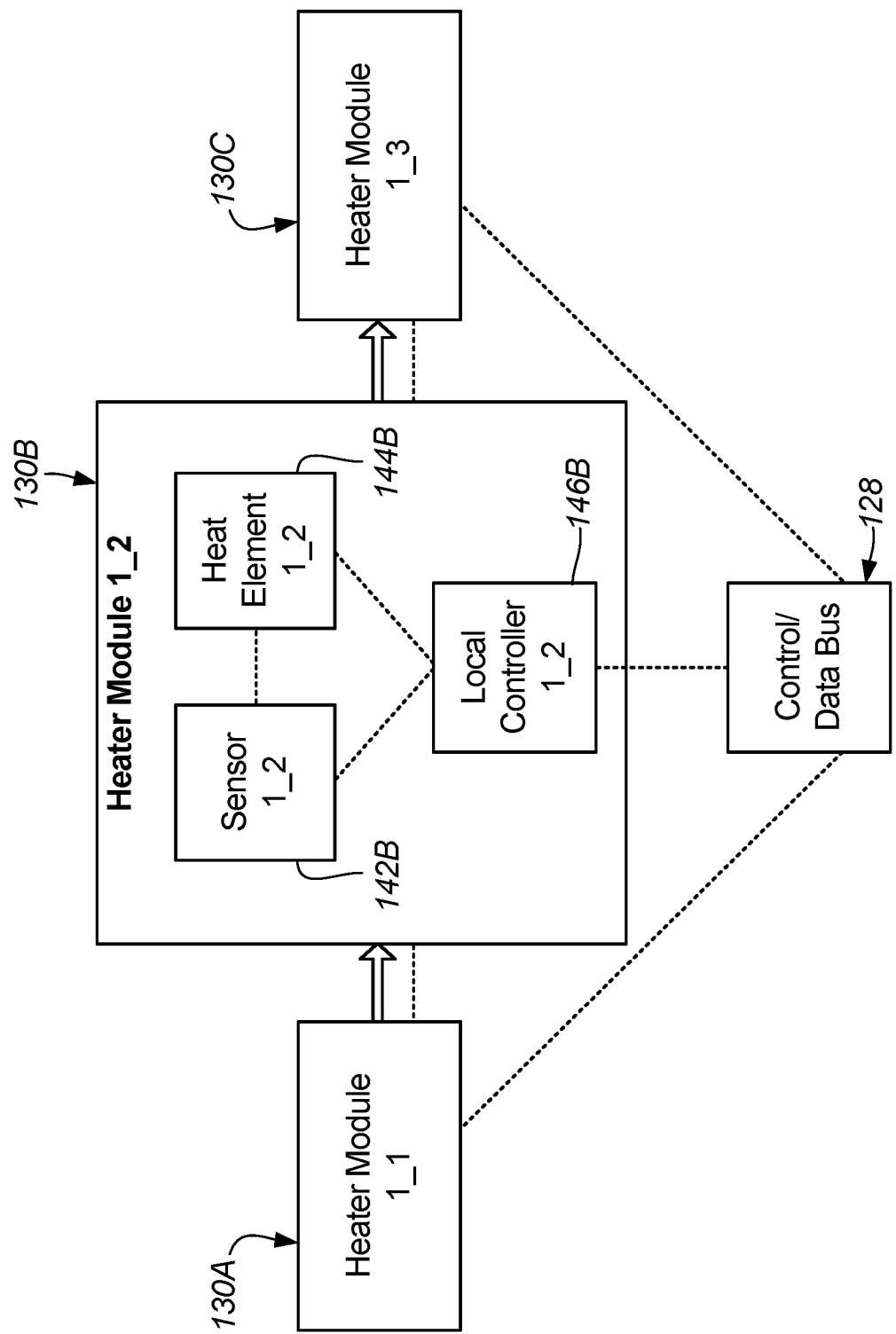
FIG. 5 is a detailed schematic including elements of an individual heater module in the system of FIG. 4.

FIG. 5 shows an example arrangement of a single heater assembly/module under normal operation. For purposes of illustration and not limitation, FIG. 5 shows details of heater module 130B (also identified as module 1_2 in order to maintain consistent numbering of the components making up each module).

Module 130B (as well as other heater modules) includes at least one temperature sensor. Here, sensor 142B (also identified as sensor 1_2) is in communication with first fluid circuit 112 for periodically measuring a temperature in first fluid circuit 112 and generating a corresponding local temperature signal of the first fluid. It also includes at least one heater element 144B (also identified as heater element 1_2) configured to selectively apply heat to first fluid circuit 112 based on the local temperature signal or another temperature signal on the network, as discussed below. Local controller 146B (controller 1_2) is programmed to receive the local temperature signal or another networked temperature signal and operate heater element 144B in response thereto, in order to maintain the local temperature signal above a predetermined threshold.

During normal operation, heater element 144B is locally controlled by local controller 146B based on local temperature signals from temperature sensor 142B. Temperature sensor 142B is polled at a first polling frequency corresponding to normal operation of the overall system. Heater element 144B is operated at a first duty cycle corresponding to normal operation of the overall system.

Figure 6A:
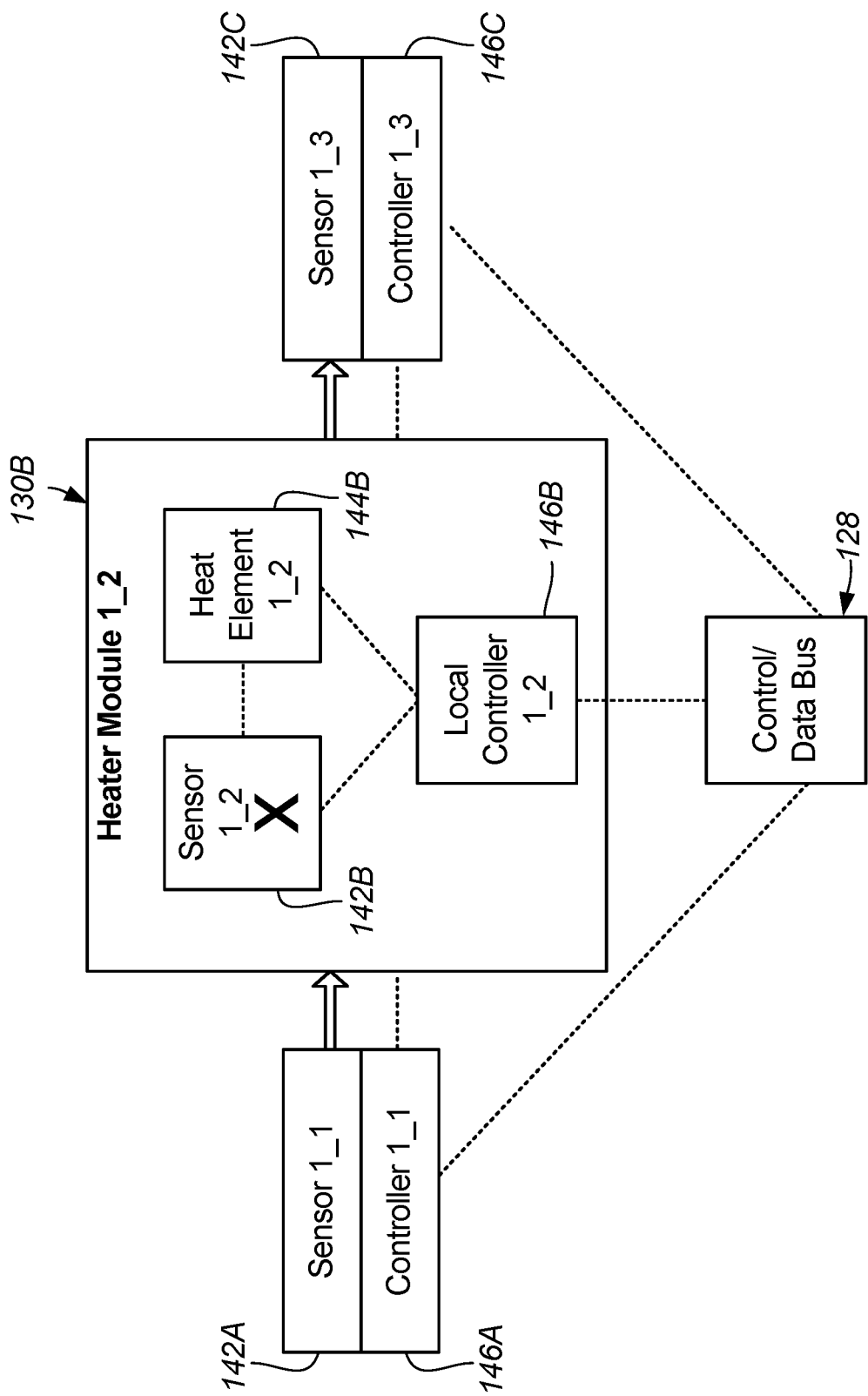
FIGS. 6A-6C show scenarios involving failure of different elements in an example heater module in the system of FIG. 4.
Figure 6B:
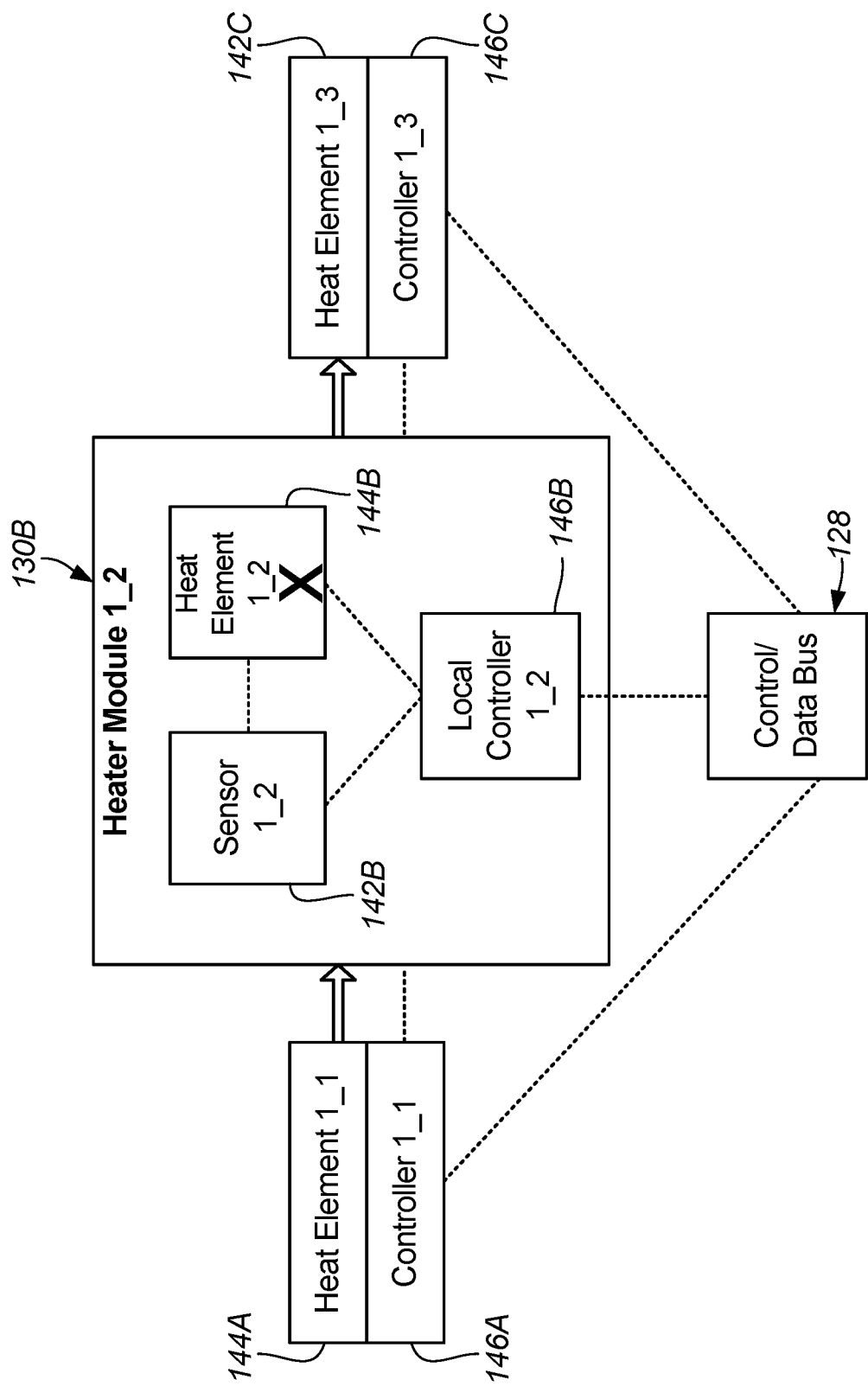
Figure 6C:
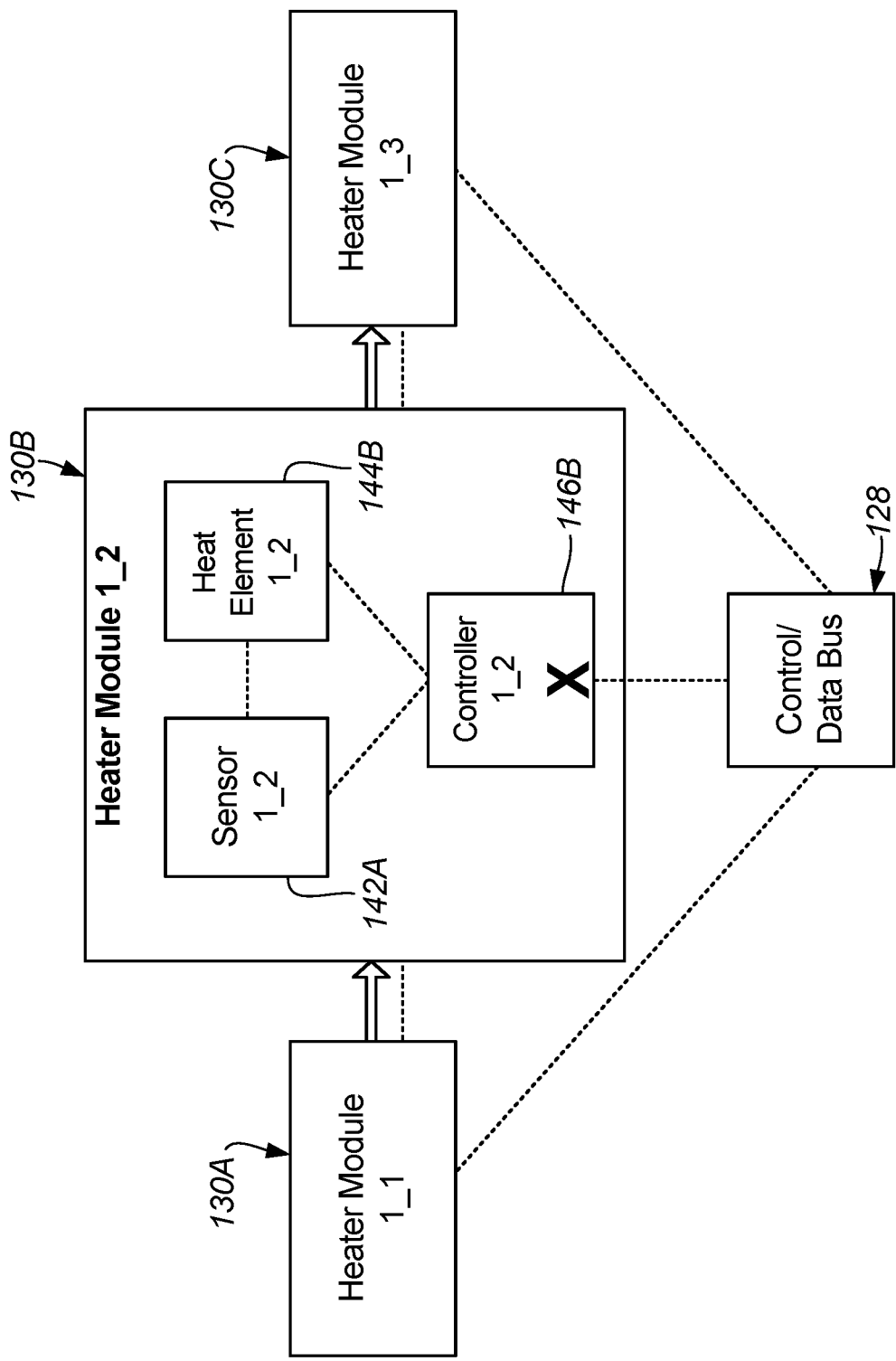

FIGS. 6A-6C show failure scenarios for different elements of a heater module, and the system response thereto. FIGS. 6A-6C are similar to FIG. 5, but differ by showing relevant details of neighboring modules 130A, 130C rather than the modules themselves. This will be made clearer in the explanation of each figure.

Beginning with FIG. 6A, module 130B includes temperature sensor 142B, heating element 144B, and local controller 146B, similar to FIG. 5. However, in FIG. 6A, temperature sensor 142A and local controller 146A take the place of module 130A, while temperature sensor 142C and local controller 146C take the place of module 130C relative to FIG. 5.

Upon determination that at least one temperature sensor (e.g., temperature sensor 412B, has failed (represented by the 'X'), local controller 146B is configured to communicate such determination to a local controller in at least another one of the networked heater assemblies. Here, that is one or both of local controllers 146A, 146C. As a result, at least one of the remaining operative temperature sensors (such as 142A and/or 142C) are polled at a second polling frequency greater than a first polling frequency corresponding to normal operation of the overall system (referenced in FIG. 5). In most cases, as shown here at least one of the remaining operative temperature sensors is immediately upstream or downstream of the failed temperature sensor(s). In any case, the remote temperature signal(s) can be transmitted to the local controller corresponding to the failed sensor in order to operate the local heater element (here, 144B). In a conventional operation, the local heater element would not receive any input at all, and would instead operate cyclically in a fail-safe mode to ensure icing doesn't occur.

Moving to FIG. 6B, module 130B still includes temperature sensor 142B, heating element 144B, and local controller 146B. However, in FIG. 6B, heating element 144A and local controller 146A take the place of module 130A, while heating element 144C and local controller 146C take the place of module 130C relative to FIG. 5.

Upon determination of a failure of the heater assembly (represented by the 'X'), local controller 146B is configured to communicate such determination to a local controller in at least another one of the networked heater assemblies. Here, that is one or both of local controllers 146A, 146C. As a result, at least one of the remaining operative heater elements (such as 144A and/or 144C) are then activated by their respective local controller at a second duty cycle greater than a first duty cycle corresponding to normal operation of the overall system. At least one of the remaining operative heater assemblies can be immediately upstream and/or downstream of the failed heater assembly.

With respect to FIG. 3C, upon determination of a failure of the local controller (represented by the 'X'), such determination is communicated to at least one other local controller in another of the networked heater modules (e.g., 146A and/or 146C). These remote controller(s) can take temporary control of the local sensor (142B) and/or heater element (144B) until the failed controller can be rebooted or repaired. Additionally or alternatively, one or both controllers 146A, 146C can operate their local sensor and/or heating element to compensate during a time when local sensor (142B) and/or heater element (144B) cannot be controlled by sensor 146B.

At a higher network level, such a system can be envisioned where the temperature sensor and heating element in each module are represented or considered nodes. Thus, a network for an aircraft, can include a plurality of (heater) modules in network communication with one another. Each of the plurality of modules can include a first node (i.e., at a temperature sensor) for communicating a local temperature signal corresponding to a local temperature of a first fluid. A second node in the module (i.e., a heating element) for communicating a signal corresponding to operation of a heating element to selectively apply heat to the first fluid circuit. A local controller is in network communication with the first and second nodes and at least one of the plurality of modules, the local controller programmed to receive the local temperature signal, or another networked temperature signal, and operate the heating element in response thereto.

The local controller includes a wireless radio or a power-line communication adapter, and the network is configured as a hierarchical network or a mesh network. Upon loss of communication with the first node, the local controller is configured to communicate with a local controller in at least another one of the plurality of modules, such that the local controller in at least another one of the plurality of modules provides the temperature signal. Upon loss of communication with the second node, the local controller is configured to communicate with a local controller in at least another one of the plurality of modules, such that the local controller in at least another one of the plurality of modules operates a corresponding heating element. Upon failure of the local controller, a local controller in at least another one of the plurality of modules compensates for such failure.

Operation of an aircraft fluid system comprising a plurality of networked heater modules is generally as follows: polling at least one first temperature sensor to periodically measure a temperature at a first location in a first fluid circuit and generate a first local temperature signal corresponding to the first location; communicating the first local temperature signal or another networked temperature signal to a first local controller; and operating at least one first heating element in response to the first local temperature signal or, in the absence of the first local temperature signal, another networked temperature signal, so as to selectively apply heat to the first fluid circuit based on the first local temperature signal, or the another networked temperature signal in order to maintain the temperature of the first fluid above a predetermined threshold.

In certain embodiments, at least the first local controller includes a wireless radio or a power-line communication adapter, and the network is a hierarchical network or a mesh network. In certain embodiments, the method also includes identifying a failure of at least one first temperature sensor at the first location; communicating the failure of at least one first temperature sensor to a second local controller in another of the networked heater modules; operating the second local controller to poll at least one second temperature sensor disposed at a second location on the first fluid circuit to provide a networked temperature signal; and communicating the networked temperature signal to the first local controller. At least one second temperature sensor is polled at a second polling frequency greater than a first polling frequency corresponding to normal system operation.

In certain other embodiments, the method additionally and/or alternatively includes identifying a failure of the at least one first heating element at the first location; communicating the failure of the at least one first heating element to a second local controller in another of the networked heater modules; and operating the second local controller to operate at least one second corresponding heating element at a second location on the first fluid circuit. The at least one first heating element is operated at a second duty cycle greater than a first duty cycle corresponding to normal system operation.

In certain other embodiments, the method additionally and/or alternatively includes upon determination of a failure of the first local controller, such determination is communicated to at least one second controller in another of the networked heater modules.

Discussion of Possible Embodiments

The following are non-exclusive descriptions of possible embodiments of the present invention.

An embodiment of a system for an aircraft includes a first fluid circuit extending from a first end to a second end and a network comprising a plurality of networked heater assemblies disposed along the first fluid circuit between the first end and the second end. Each of the networked heater assemblies includes at least one temperature sensor, a heater element, and a local controller. The at least one temperature sensor is in communication with the first fluid circuit for periodically measuring a temperature in the first fluid circuit and generating a corresponding local temperature signal. The heater assembly selectively applies heat to the first fluid circuit based on the local temperature signal or another temperature signal on the network. The local controller receives the local temperature signal or another networked temperature signal and operates the heater assembly in response thereto in order to maintain the local temperature signal above a predetermined threshold.

The system of the preceding paragraph can optionally include, additionally and/or alternatively, any one or more of the following features, configurations and/or additional components:

A system for an aircraft according to an exemplary embodiment of this disclosure, among other possible things includes a first fluid circuit extending from a first end to a second end; a network comprising a plurality of networked heater assemblies disposed along the first fluid circuit between the first end and the second end, each of the networked heater assemblies comprising: at least one temperature sensor in communication with the first fluid circuit for periodically measuring a temperature in the first fluid circuit and generate a corresponding local temperature signal; a heater assembly configured to selectively apply heat to the first fluid circuit based on the local temperature signal or another temperature signal on the network; a local controller programmed to receive the local temperature signal or another networked temperature signal and operate the heater assembly in response thereto in order to maintain the local temperature signal above a predetermined threshold.

A further embodiment of the foregoing system, wherein the network is a hierarchical network or a mesh network.

A further embodiment of any of the foregoing systems, wherein the local controller includes a wireless radio or a power-line communication adapter.

A further embodiment of any of the foregoing systems, wherein upon determination that the at least one temperature sensor has failed, the local controller is configured to communicate such determination to a local controller in at least another one of the networked heater assemblies, such that at least one of the remaining operative temperature sensors are polled at a second polling frequency greater than or equal to a first polling frequency corresponding to normal operation of the overall system.

A further embodiment of any of the foregoing systems, wherein the at least one of the remaining operative temperature sensors is immediately upstream of the failed at least one temperature sensor.

A further embodiment of any of the foregoing systems, wherein upon determination of a failure of the heater assembly, the local controller is configured to communicate such determination to a local controller in at least another one of the networked heater assemblies, such that at least one of remaining operative heating assembles are activated at a second duty cycle greater than a first duty cycle corresponding to normal operation of the overall system.

A further embodiment of any of the foregoing systems, wherein the at least one of the remaining operative heater assemblies is immediately upstream of the failed at least one heater assembly.

A further embodiment of any of the foregoing systems, wherein upon determination of a failure of the local controller, such determination is communicated to at least one other local controller in another of the networked heater assemblies.

An embodiment of a network for an aircraft includes a plurality of modules in network communication with one another. Each of the plurality of modules includes a first node for communicating a local temperature signal corresponding to a local temperature of a first fluid, a second node for communicating a signal corresponding to operation of a heating element, and a local controller in network communication with the first and second nodes and at least one of the plurality of modules. The local controller is programmed to receive the local temperature signal, or another networked temperature signal, and operate the heating element in response thereto.

The network of the preceding paragraph can optionally include, additionally and/or alternatively, any one or more of the following features, configurations and/or additional components:

A network for an aircraft according to an exemplary embodiment of this disclosure, among other possible things includes a plurality of modules in network communication with one another, each of the plurality of modules comprising: a first node for communicating a local temperature signal corresponding to a local temperature of a first fluid; a second node for communicating a signal corresponding to operation of a heating element to selectively apply heat to the first fluid circuit; and a local controller in network communication with the first and second nodes and at least one of the plurality of modules, the local controller programmed to receive the local temperature signal, or another networked temperature signal, and operate the heating element in response thereto.

A further embodiment of the foregoing network, wherein the local controller includes a wireless radio or a power-line communication adapter, and the network is configured as a hierarchical network or a mesh network.

A further embodiment of any of the foregoing networks, wherein upon loss of communication with the first node, the local controller is configured to communicate with a local controller in at least another one of the plurality of modules, such that the local controller in the at least another one of the plurality of modules provides the another temperature signal.

A further embodiment of any of the foregoing networks upon loss of communication with the second node, the local controller is configured to communicate with a local controller in at least another one of the plurality of modules, such that the local controller in the at least another one of the plurality of modules operates a corresponding heating element.

A further embodiment of any of the foregoing networks upon failure of the local controller, a local controller in at least another one of the plurality of modules compensates for such failure.

An example embodiment of a method is described for operating an aircraft fluid system comprising a plurality of networked heater modules. The method includes polling at least one first temperature sensor to periodically measure a temperature at a first location in a first fluid circuit and generate a first local temperature signal corresponding to the first location. The first local temperature signal or another networked temperature signal is communicated to a first local controller. At least one first heating element is operated in response to the first local temperature signal or, in the absence of the first local temperature signal, another networked temperature signal. The heating element is operated so as to selectively apply heat to the first fluid circuit based on the first local temperature signal, or the another networked temperature signal in order to maintain the temperature of the first fluid above a predetermined threshold.

The method of the preceding paragraph can optionally include, additionally and/or alternatively, any one or more of the following features, configurations and/or additional components:

A method for an aircraft according to an exemplary embodiment of this disclosure, among other possible things includes polling at least one first temperature sensor to periodically measure a temperature at a first location in a first fluid circuit and generate a first local temperature signal corresponding to the first location; communicating the first local temperature signal or another networked temperature signal to a first local controller; and operating at least one first heating element in response to the first local temperature signal or, in the absence of the first local temperature signal, another networked temperature signal, so as to selectively apply heat to the first fluid circuit based on the first local temperature signal, or the another networked temperature signal in order to maintain the temperature of the first fluid above a predetermined threshold.

A further embodiment of the foregoing method, wherein the first local controller includes a wireless radio or a power-line communication adapter, and the network is a hierarchical network or a mesh network.

A further embodiment of any of the foregoing methods, further comprising: identifying a failure of the at least one first temperature sensor at the first location; communicating the failure of the at least one first temperature sensor to a second local controller in another of the networked heater modules; operating the second local controller to poll at least one second temperature sensor disposed at a second location on the first fluid circuit to provide a networked temperature signal; and communicating the networked temperature signal to the first local controller.

A further embodiment of any of the foregoing methods, wherein the at least one second temperature sensor is polled at a second polling frequency greater than or equal to the a first polling frequency corresponding to normal system operation.

A further embodiment of any of the foregoing methods, further comprising: identifying a failure of the at least one first heating element at the first location; communicating the failure of the at least one first heating element to a second local controller in another of the networked heater modules; and operating the second local controller to operate at least one second corresponding heating element at a second location on the first fluid circuit.

A further embodiment of any of the foregoing methods, wherein the at least one first heating element is operated at a second duty cycle greater than a first duty cycle corresponding to normal system operation.

A further embodiment of any of the foregoing methods, wherein upon determination of a failure of the first local controller, such determination is communicated to at least one second controller in another of the networked heater modules.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for an aircraft, comprising:
   a first fluid circuit extending from a first end to a second end;
   a network comprising a plurality of networked heater assemblies disposed along the first fluid circuit between the first end and the second end, each of the networked heater assemblies comprising:
      at least one temperature sensor in communication with the first fluid circuit for periodically measuring a temperature in the first fluid circuit and generate a corresponding local temperature signal;
      a heater element configured to selectively apply heat to the first fluid circuit based on the local temperature signal or another temperature signal on the network;
      a local controller programmed to receive the local temperature signal or another networked temperature signal and operate the heater assembly in response thereto in order to maintain the local temperature signal above a predetermined threshold;
      wherein upon determination that the at least one temperature sensor has failed, the local controller is configured to communicate such determination to a local controller in at least another one of the networked heater assemblies, such that at least one of the remaining operative temperature sensors are polled at a second polling frequency greater than or equal to a first polling frequency corresponding to normal operation of the overall system.

2. The system of claim 1, wherein the network is a hierarchical network or a mesh network.

3. The system of claim 1, wherein the local controller includes a wireless radio or a power-line communication adapter.

4. The system of claim 1, wherein the at least one of the remaining operative temperature sensors is immediately upstream of the failed at least one temperature sensor.

5. The system of claim 1, wherein upon determination of a failure of the heater assembly, the local controller is configured to communicate such determination to a local controller in at least another one of the networked heater assemblies, such that at least one of remaining operative heating assembles are activated at a second duty cycle greater than a first duty cycle corresponding to normal operation of the overall system.

6. The system of claim 5, wherein the at least one of the remaining operative heater assemblies is immediately upstream of the failed at least one heater assembly.

7. The system of claim 1, wherein upon determination of a failure of the local controller, such determination is communicated to at least one other local controller in another of the networked heater assemblies.

8. A network for an aircraft, comprising:
a plurality of modules in network communication with one another, each of the plurality of modules comprising:
a first node for communicating a local temperature signal corresponding to a local temperature of a first fluid;
a second node for communicating a signal corresponding to operation of a heating element to selectively apply heat to the first fluid circuit; and
a local controller in network communication with the first and second nodes and at least one of the plurality of modules, the local controller programmed to receive the local temperature signal, or another networked temperature signal, and operate the heating element in response thereto;
wherein upon loss of communication with the first node, the local controller is configured to communicate with a local controller in at least another one of the plurality of modules, such that the local controller in the at least another one of the plurality of modules provides the another temperature signal.

9. The network of claim 8, wherein the local controller includes a wireless radio or a power-line communication adapter, and the network is configured as a hierarchical network or a mesh network.

10. The network of claim 8, wherein upon loss of communication with the second node, the local controller is configured to communicate with a local controller in at least another one of the plurality of modules, such that the local controller in the at least another one of the plurality of modules operates a corresponding heating element.

11. The network of claim 8, wherein upon failure of the local controller, a local controller in at least another one of the plurality of modules compensates for such failure.

12. A method for operating an aircraft fluid system comprising a plurality of networked heater modules, the method comprising:
polling at least one first temperature sensor to periodically measure a temperature at a first location in a first fluid circuit and generate a first local temperature signal corresponding to the first location;
communicating the first local temperature signal or another networked temperature signal to a first local controller;
identifying a failure of the at least one first temperature sensor at the first location;
communicating the failure of the at least one first temperature sensor to a second local controller in another of the networked heater modules;
operating the second local controller to poll at least one second temperature sensor disposed at a second location on the first fluid circuit to provide a networked temperature signal;
communicating the networked temperature signal to the first local controller; and
operating at least one first heating element in response to the first local temperature signal or, in the absence of the first local temperature signal, another networked temperature signal, so as to selectively apply heat to the first fluid circuit based on the first local temperature signal, or the another networked temperature signal in order to maintain the temperature of the first fluid above a predetermined threshold.

13. The method of claim 12, wherein the first local controller includes a wireless radio or a power-line communication adapter, and the network is a hierarchical network or a mesh network.

14. The method of claim 12, wherein the at least one second temperature sensor is polled at a second polling frequency greater than or equal to a first polling frequency corresponding to normal system operation.

15. The method of claim 12, further comprising:
identifying a failure of the at least one first heating element at the first location;
communicating the failure of the at least one first heating element to a second local controller in another of the networked heater modules; and
operating the second local controller to operate at least one second corresponding heating element at a second location on the first fluid circuit.

16. The method of claim 15, wherein the at least one first heating element is operated at a second duty cycle greater than a first duty cycle corresponding to normal system operation.

17. The method of claim 12, wherein upon determination of a failure of the first local controller, such determination is communicated to at least one second controller in another of the networked heater modules.

* * * * *